United States Patent
Mao et al.

(10) Patent No.: US 12,483,104 B2
(45) Date of Patent: Nov. 25, 2025

(54) LINEAR VIBRATION MOTOR

(71) Applicant: AAC Microtech (Changzhou) Co., Ltd., Changzhou (CN)

(72) Inventors: Lubin Mao, Shenzhen (CN); Ziang Li, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 0 days.

(21) Appl. No.: 17/915,511

(22) PCT Filed: Jul. 20, 2022

(86) PCT No.: PCT/CN2022/106638
§ 371 (c)(1),
(2) Date: Jan. 4, 2024

(87) PCT Pub. No.: WO2024/000680
PCT Pub. Date: Jan. 4, 2024

(65) Prior Publication Data
US 2024/0213865 A1 Jun. 27, 2024

(30) Foreign Application Priority Data
Jun. 30, 2022 (CN) .......................... 202210765358.8

(51) Int. Cl.
*H02K 33/02* (2006.01)
*H02K 1/14* (2006.01)
*H02K 33/18* (2006.01)

(52) U.S. Cl.
CPC .............. *H02K 33/02* (2013.01); *H02K 1/14* (2013.01); *H02K 33/18* (2013.01)

(58) Field of Classification Search
CPC ........ H02K 35/00; H02K 35/02; H02K 35/04; H02K 35/06; H02K 35/08; H02K 33/00–18; H02K 33/02; H02K 33/04
USPC ...................................... 310/15–28
See application file for complete search history.

(56) References Cited

U.S. PATENT DOCUMENTS

| | | | | |
|---|---|---|---|---|
| 5,973,422 A | * | 10/1999 | Clamme | H02K 33/16 310/90.5 |
| 6,501,357 B2 | * | 12/2002 | Petro | H01H 51/2209 335/229 |
| 7,078,832 B2 | * | 7/2006 | Inagaki | H02K 7/14 335/238 |

(Continued)

*Primary Examiner* — Maged M Almawri
(74) *Attorney, Agent, or Firm* — Wiersch Law Group

(57) ABSTRACT

A linear vibration motor includes a vibration assembly including a mass block and a magnet assembly fixed to the mass block; and a stator assembly including an iron core and a coil. The iron core includes an iron core body and an extending structure. The extending structure includes first extending portions, first claw poles bending and extending from the first extending portions to a second end portion, second extending portions extending from the second end portion, and second claw poles bending and extending from the second extending portions. The first and the second claw poles are arranged at intervals along a vibration direction and directly face towards the magnet assembly. With the first and the second claw poles staggered along the vibration direction, the thickness of the linear vibration motor is reduced while ensuring sufficient driving force, so that it can be better applied to light and thin mobile terminals.

10 Claims, 6 Drawing Sheets

(56) References Cited

U.S. PATENT DOCUMENTS

| | | | | |
|---|---|---|---|---|
| 7,586,220 B2* | 9/2009 | Roberts | H02K 1/34 | 290/1 R |
| 7,791,456 B2* | 9/2010 | Miura | H02K 33/16 | 340/407.1 |
| 7,948,124 B1* | 5/2011 | Waters | H02K 35/00 | 310/36 |
| 8,097,991 B2* | 1/2012 | Masami | H02K 33/16 | 310/15 |
| 8,456,032 B2* | 6/2013 | Hochberg | F03B 13/00 | 290/43 |
| 8,593,017 B2* | 11/2013 | Stefanini | H02K 35/02 | 290/1 R |
| 8,629,569 B2* | 1/2014 | Roberts | H02K 35/02 | 290/1 R |
| 8,723,376 B2* | 5/2014 | Kawakami | H02K 41/031 | 310/12.24 |
| 9,461,530 B2* | 10/2016 | Wasenczuk | H02K 35/02 | |
| 9,906,109 B2* | 2/2018 | Endo | H02K 33/16 | |
| 10,170,969 B2* | 1/2019 | Ohishi | H02K 7/1876 | |
| 10,622,538 B2* | 4/2020 | Zhang | H10N 30/802 | |
| 11,031,857 B2* | 6/2021 | Wasenczuk | H02N 2/186 | |
| 11,152,843 B2* | 10/2021 | Wasenczuk | H02K 1/34 | |
| 11,418,099 B2* | 8/2022 | Takahashi | H02K 33/16 | |
| 11,515,774 B2* | 11/2022 | Yan | H02K 33/16 | |
| 11,658,555 B2* | 5/2023 | Mori | H02K 33/16 | 310/28 |
| 11,714,490 B2* | 8/2023 | Kim | H02P 25/032 | 345/173 |
| 11,831,214 B2* | 11/2023 | Chiba | B06B 1/14 | |
| 11,843,298 B2* | 12/2023 | Ando | H02K 33/18 | |
| 11,943,599 B2* | 3/2024 | Patsouras | H04R 11/14 | |
| 11,973,389 B2* | 4/2024 | Neubauer | H02K 33/16 | |
| 2004/0119343 A1* | 6/2004 | Ueda | G10K 9/22 | 310/12.31 |
| 2007/0182257 A1* | 8/2007 | Miura | H04R 9/02 | 310/23 |
| 2008/0265692 A1* | 10/2008 | Roberts | H02K 1/34 | 310/15 |
| 2010/0066182 A1* | 3/2010 | Yamazaki | B06B 1/045 | 310/29 |
| 2010/0327672 A1* | 12/2010 | Roberts | H02K 35/00 | 310/25 |
| 2011/0133577 A1* | 6/2011 | Lee | H02K 33/18 | 310/15 |
| 2011/0193426 A1* | 8/2011 | Chung | H02K 33/16 | 310/25 |
| 2011/0198948 A1* | 8/2011 | Keisuke | H02K 5/225 | 310/25 |
| 2011/0198949 A1* | 8/2011 | Furuich | H02K 33/16 | 310/25 |
| 2011/0260559 A1* | 10/2011 | Kanai | B06B 1/16 | 310/25 |
| 2012/0212097 A1* | 8/2012 | Wasenczuk | B06B 1/04 | 310/216.001 |
| 2013/0033129 A1* | 2/2013 | Hong | B06B 1/045 | 310/25 |
| 2013/0076178 A1* | 3/2013 | Kuroda | H02K 1/06 | 310/81 |
| 2013/0285479 A1* | 10/2013 | Kinoshita | H02K 35/02 | 310/12.12 |
| 2013/0342032 A1* | 12/2013 | Laurent | H02K 35/04 | 310/306 |
| 2014/0103751 A1* | 4/2014 | Furukawa | H02K 35/02 | 310/25 |
| 2014/0132089 A1* | 5/2014 | Jeon | H02K 33/18 | 310/14 |
| 2014/0265651 A1* | 9/2014 | Kim | H02K 33/16 | 310/25 |
| 2015/0226197 A1* | 8/2015 | Hahn | F04B 39/122 | 417/363 |
| 2015/0330449 A1* | 11/2015 | Ribault | B23K 11/26 | 219/121.64 |
| 2017/0288523 A1* | 10/2017 | Katada | H02P 25/032 | |
| 2017/0366077 A1* | 12/2017 | Oonishi | H02J 50/00 | |
| 2019/0207496 A1* | 7/2019 | Takahashi | H02K 33/02 | |
| 2020/0044538 A1* | 2/2020 | Tang | H02K 33/18 | |
| 2020/0212776 A1* | 7/2020 | Ling | H02K 33/16 | |
| 2020/0274432 A1* | 8/2020 | Wauke | H02K 33/06 | |
| 2021/0028679 A1* | 1/2021 | Wasenczuk | H02K 1/34 | |
| 2021/0328491 A1* | 10/2021 | Takahashi | H02K 33/06 | |
| 2022/0085709 A1* | 3/2022 | Oonishi | B06B 1/045 | |
| 2022/0123639 A1* | 4/2022 | Takahashi | H02K 33/16 | |
| 2022/0123642 A1* | 4/2022 | Takahashi | H02K 33/16 | |
| 2022/0352800 A1* | 11/2022 | Li | H02K 33/16 | |
| 2023/0074890 A1* | 3/2023 | Muniraju | H10N 10/13 | |
| 2023/0101894 A1* | 3/2023 | Takahashi | H02K 33/02 | 310/81 |
| 2023/0361662 A1* | 11/2023 | Takahashi | B06B 1/045 | |
| 2024/0186875 A1* | 6/2024 | Chiba | H02K 5/24 | |

* cited by examiner

100

LINEAR VIBRATION MOTOR

TECHNICAL FIELD

The present disclosure relates to a motor, and in particular, to a linear vibration motor used in the field of mobile electronic products.

BACKGROUND

With the development of electronic technology, portable consumer electronic products are more and more popular, such as mobile phones, handheld game consoles, navigation devices, or handheld multimedia entertainment equipment, etc. These electronic products generally use linear vibration motors for system feedback, such as mobile phone call prompts, information prompts, navigation prompts, vibration feedback from game consoles, etc.

In the related art, the linear vibration motor includes a housing with an accommodation space, a vibration assembly located in the accommodation space, and a stator assembly fixed to the housing. The vibration assembly includes a mass block with an accommodation hole and a magnet fixed to the mass block and accommodated in the accommodation hole. The stator assembly is partially accommodated in the accommodation hole and includes an iron core and a coil wound around the iron core. The coil interacts with the magnet to generate a driving force to drive the vibration assembly to reciprocate, thereby providing vibration.

However, in order to generate sufficient driving force between the coil and the magnet, the linear vibration motor in the related art has a design of a magnetic circuit requiring a certain thickness space, which makes the product height of the linear vibration motor cannot be further reduced and is inconsistent with the development trend of thin and light the common consumer electronic products.

Therefore, it is necessary to provide a new linear vibration motor to solve the above problems.

SUMMARY

In view of the above problems, the present disclosure proposes a linear vibration motor with good vibration performance and small thickness.

In order to achieve the above-mentioned purpose, the present disclosure provides a linear vibration motor. The linear vibration motor includes a housing having an accommodation space, and a vibration assembly and a stator assembly that are accommodated in the accommodation space. The vibration assembly includes a mass block accommodated in the accommodation space, a magnet assembly fixed to the mass block, and a guide member configured to drive the mass block to reciprocate. The mass block includes an accommodation hole penetrating through the mass block, and the magnet assembly is accommodated in the accommodation hole. The stator assembly is fixed to the housing and is at least partially accommodated in the accommodation hole, and the stator assembly includes an iron core fixed to the housing, and a coil wound on the iron core. The iron core includes an iron core body winding the coil, and an extending structure. The iron core body includes a first end portion and a second end portion that are arranged along a thickness direction of the coil. The extending structure includes first extending portions, first claw poles, second extending portions, and second claw poles. The first extending portions are parallel to and spaced apart from each other and each extend from the first end portion towards the magnet assembly. The first claw poles each bend and extend from an end of one of the first extending portions away from the iron core body towards the second end portion. The second extending portions are parallel to and spaced apart from each other and each extend from the second end portion towards the magnet assembly. The second claw poles each bend and extend from an end of one of the second extending portions away from the iron core body towards the first end portion. The first claw poles and the second claw poles are arranged at intervals along a vibration direction and directly face towards the magnet assembly.

As an improvement, the iron core body has a height in the thickness direction, which is greater than a thickness of the coil, and the first end portion and the second end portion extends beyond the coil along the thickness direction.

As an improvement, the coil includes a first top surface perpendicular to the thickness direction, a first bottom surface opposite to the first top surface and spaced apart from the first top surface, and an outer side surface connecting the first top surface with the first bottom surface. The first extending portions are parallel to the first top surface, the second extending portions are parallel to the first bottom surface, and the first claw poles and the second claw poles each are parallel to the outer side surface.

As an improvement, the coil is in a shape of a racetrack, the outer side surface includes a first outer side surface extending along a long axis and parallel to the vibration direction, and the first claw poles and the second claw poles are staggered in sequence along the first outer side surface.

As an improvement, a projection of the first extending portion along the thickness direction is located between two adjacent second extending portions of the second extending portions.

As an improvement, the magnet assembly includes a magnet that is fixed to the mass block and opposite to and spaced apart from the first claw poles and the second claw poles. The magnet has first magnetization regions opposite to the first claw poles, and second magnetization regions opposite to the second claw pole. The first magnetization regions have a magnetization direction opposite to a magnetization direction of the second magnetization regions.

As an improvement, the magnetization direction of the magnet is perpendicular to the thickness direction and the vibration direction.

As an improvement, the housing comprises a bottom cover for fixing the iron core body, a top cover opposite to and spaced apart from the bottom cover, and a side wall for connecting the bottom cover with the top cover, and the coil is spaced apart from the bottom cover and the top cover.

As an improvement, the guide member is a spring, wherein the spring has an end fixed to the mass block, and another end fixed to the side wall.

As an improvement, the guide member comprises a first permanent magnet fixed to the mass block, and a second permanent magnet fixed to the side wall, wherein the first permanent magnet and the second permanent magnet are opposite to each other along the vibration direction and are magnetized along the vibration direction, and a pole of the first permanent magnet and a pole of the second permanent magnet that have a same polarity are opposite to each other.

Compared with the related art, the vibration assembly of the linear vibration motor provided by the present disclosure includes the mass block having the accommodation hole, the magnet assembly fixed to the mass block, and the guide member configured to drive the mass block to reciprocate; the stator assembly at least partially accommodated in the accommodation hole includes the iron core and the coil wound on the iron core; the iron core includes the iron core body winding the coil, and an extending structure; and the extending structure includes the first extending portions, the first claw poles, the second extending portions, and the second claw poles; the first extending portions are parallel to and spaced apart from each other and each extend from the first end portion towards the magnet assembly; the first claw poles each bend and extend from an end of one of the first extending portions away from the iron core body towards the second end portion; the second extending portions are parallel to and spaced apart from each other and each extend from the second end portion towards the magnet assembly; and the second claw poles bend and extend from the second extending portion toward the first end portion; the first claw poles and the second claw poles are arranged at intervals along the vibration direction and directly face towards the magnet assembly. After the coil is energized, the first claw pole and the second claw pole are polarized to interact with the magnet assembly to generate a driving force. With the first claw poles and the second claw poles that are staggered along the vibration direction, the thickness of the linear vibration motor is reduced while ensuring sufficient driving force, so that the linear vibration motor can be better applied to light and thin mobile terminals.

DESCRIPTION OF EMBODIMENTS

Figure 1:
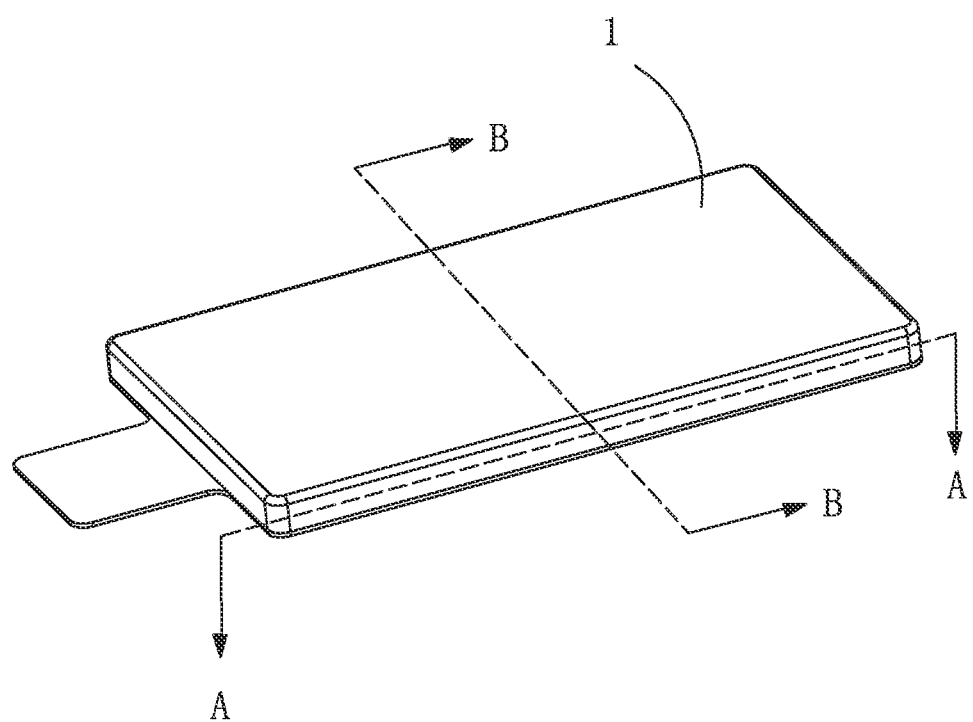
FIG. 1 is a perspective view of a linear vibration motor according to an embodiment of the present disclosure.
Figure 2:
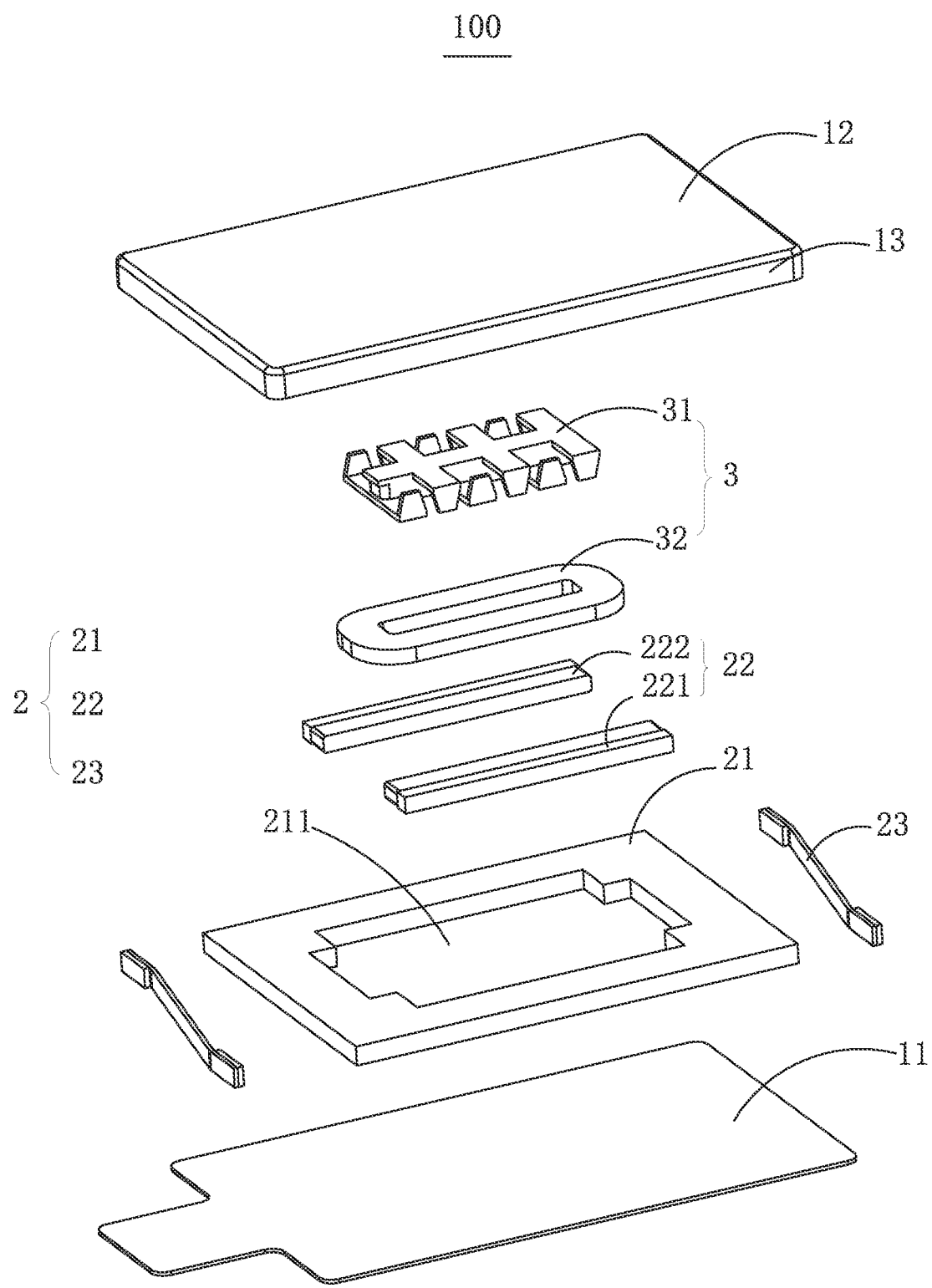
FIG. 2 is an exploded view of a linear vibration motor according to an embodiment of the present disclosure.
Figure 3:
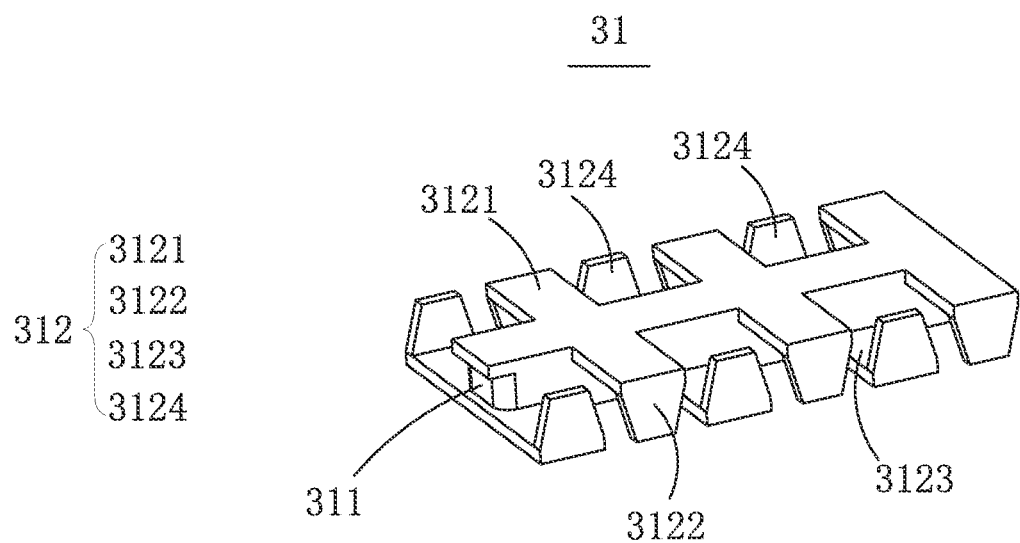
FIG. 3 is a perspective view of an iron core of a linear vibration motor according to an embodiment of the present disclosure.
Figure 4:
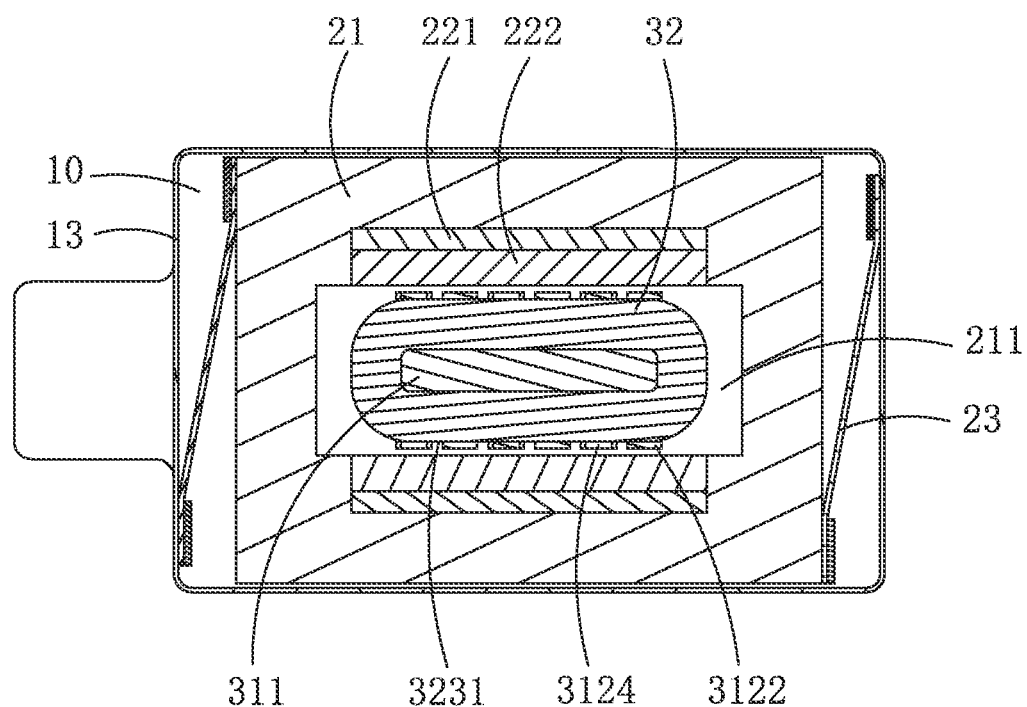
FIG. 4 is a sectional view along line A-A shown in FIG. 1 according to an embodiment of the present disclosure.
Figure 5:
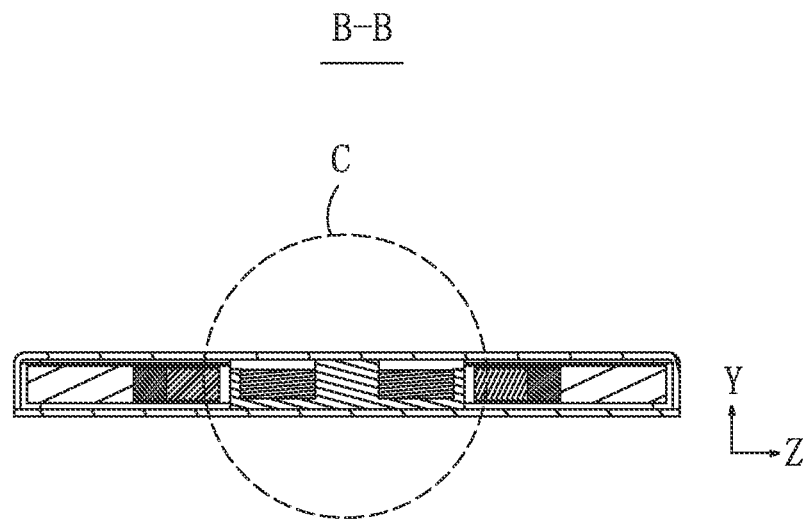
FIG. 5 is a sectional view along line B-B shown in FIG. 1 according to an embodiment of the present disclosure.
Figure 6:
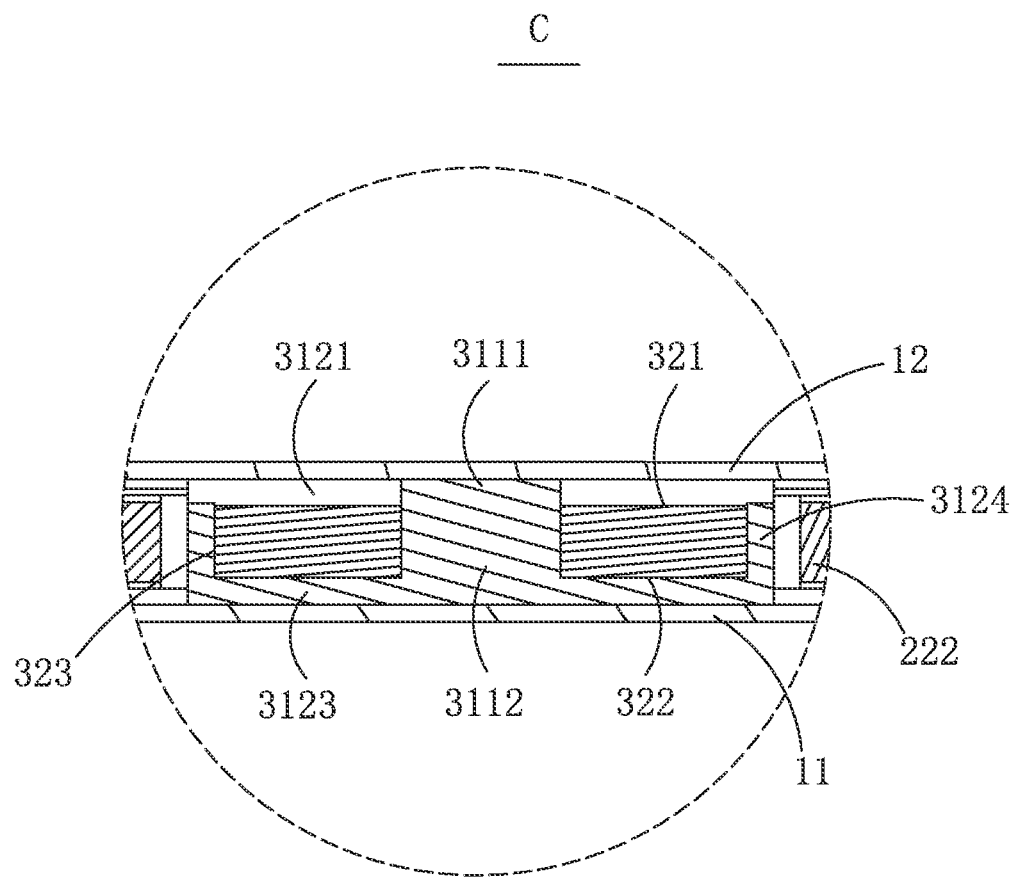
FIG. 6 is an enlarged view of portion C shown in FIG. 5 according to an embodiment of the present disclosure.

The technical solutions of the present disclosure will be clearly and completely described below with reference to accompanying drawings and specific embodiments.

As shown in FIG. 1-FIG. 7, the present disclosure provides a linear vibration motor 100. The linear vibration motor 100 includes a housing 1 having an accommodation space 10, and a vibration assembly 2 and a stator assembly 3 that are accommodated in the accommodation space 10. The stator assembly 3 can drive the vibration assembly 2 to vibrate reciprocally along a vibration direction X of the stator assembly 3 to provide vibration.

The housing 1 includes a bottom cover 11 for fixing the stator assembly 3, a top cover 12 opposite to and spaced apart from the bottom cover 11, and a side wall 13 connecting the bottom cover 11 with the top cover 12. The bottom cover 11, the top cover 12, and the side wall 13 enclose to define the accommodation space 10.

Figure 7:
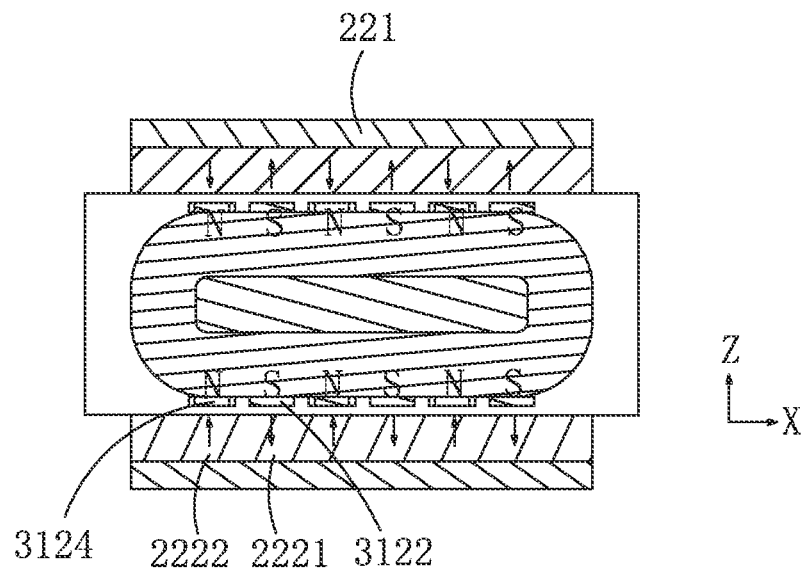
FIG. 7 is a schematic diagram showing a magnetic circuit between a pole core and a magnet of a linear vibration motor according to an embodiment of the present disclosure.

The vibration assembly 2 includes a mass block 21 accommodated in the accommodation space 10, a magnet assembly 22 fixed to the mass block 21, and a guide member 23 that drives the mass block 21 to reciprocate. The mass block 21 includes an accommodation hole 211 penetrating therethrough. The magnet component 22 is accommodated in the accommodation hole 211. In some embodiments, the magnet component 22 includes a pole core 221 fixed to the mass block 21 and a magnet 222 fixed to the pole core 221. It can be seen that the pole core 221 is sandwiched between the magnet 222 and the mass block 21. The magnet 222 is opposite to the stator assembly 3. As shown in FIG. 7, the magnet 222 includes first magnetization regions 2221 and second magnetization regions 2222 which are adjacent to each other in the vibration direction X, and the first magnetization region 2221 and the second magnetization region 2222 have opposite magnetization directions.

The stator assembly 3 includes an iron core 31 fixed to the bottom cover 11 of the housing 1, and a coil 32 wound on the iron core 31. As shown in FIG. 2 to FIG. 6, the iron core 31 includes an iron core body 311 winding the coil 32 and an extending structure 312. The coil 32 is wound at the middle position of the iron core body 311 along the thickness direction Y. In this way, the coil 32 is spaced apart from each of the bottom cover 11 and the top cover 12. The core body 311 includes a first end portion 3111 and a second end portion 3112 along the thickness direction Y of the coil 32. The extending structure 312 includes first extending portions 3121, first claw poles 3122, second extending portions 3123, and second claw poles 3124. The first extending portions 3121 are parallel to and spaced apart from each other and each extend from the first end portion 3111 towards the magnet assembly 22. The first claw pole 3122 bends and extends from an end of one of the first extending portions 3121 away from the iron core body 311 towards the second end portion 3112. The second extending portions 3123 are parallel to and spaced apart from each other and each extend from the second end portion 3112 towards the magnet assembly 22. The second claw pole 3124 bends and extends from an end of one of the second extending portion 3123 away from the iron core body 311 towards the first end portion 3111. The first claw poles 3122 and the second claw poles 3124 are arranged at intervals along a vibration direction X and directly face towards the magnet assembly 22. A projection of the first extending portion 3121 along the thickness direction Y is located between two adjacent second extending portions 3123. It can be understood that the number of the first claw pole 3122 and the number of the second claw pole 3124 can be adjusted according to requirements, which are not limited herein.

In some embodiments, in order to enable the first end portion 3111 and the second end portion 3112 to extend beyond the coil 32, a height of the iron core body 311 along the thickness direction Y is greater than a thickness of the coil 32. The coil 32 includes a first top surface 321 perpendicular to the thickness direction Y, a first bottom surface 322 opposite to the first top surface 321 and spaced apart from the first top surface 321, and an outer side surface 323 connecting the first top surface 321 and the first bottom surface 322. The first extending portion 3121 is parallel to the first top surface 321, the second extending portion 3123 is parallel to the first bottom surface 322. The first claw pole 3122 and the second claw pole 3124 are both parallel to the outer side surface 323.

In this embodiment, the first claw pole 3122 is opposite to the first magnetization region 2221, and the second claw pole 3124 is opposite to the second magnetization region 2222. It can be understood that in the linear vibration motor 100 provided by the present disclosure, the magnetization direction Z of the first magnetization region 2221 of the magnet 222 and the magnetization direction Z of the second magnetization region 2222 of the magnet 222 are perpendicular to the vibration direction X and the thickness direction Y. Therefore, the first claw pole 3122 and the first magnetization region 2221 are opposite to each other along the magnetization direction Z, and the same is for the second claw pole 3124, that is, the second claw pole 3124 and the second magnetization regions 2222 are opposite to each other along the magnetization direction Z.

The coil 32 is in a shape of a racetrack. The outer side surface 323 includes a first outer side surface 3231 extending along a long axis direction and parallel to the vibration direction X. The first claw poles 3122 and the second claw poles 3124 are sequentially staggered along the first outer side surface 3231. In this way, when the coil 32 is energized, the pole core 31 is polarized, and the first claw pole 3122 and the second claw pole 3124 have different polarities, respectively interacting with the magnet 222 to generate a driving force to drive the mass block to vibrate reciprocally along the vibration direction X. In this way, the magnet 222 configured to generate the driving force, the first claw pole 3122, and the second claw pole 3124 are arranged along the vibration direction X, rather than the thickness direction Y. On the premise of ensuring sufficient driving force, the thickness of the linear vibration motor 100 is reduced, so that the linear vibration motor 100 can be better applied to thin and light mobile terminals.

In some embodiments, the guide member 23 of the linear vibration motor 100 is a spring, and the spring includes an end fixed to the mass block 21 and another end fixed to the side wall 13 of the housing 1.

Figure 8:
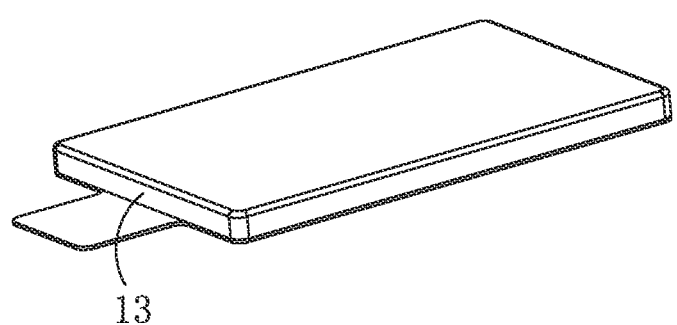
FIG. 8 is a perspective view of a linear vibration motor according to another embodiment of the present disclosure.
Figure 9:
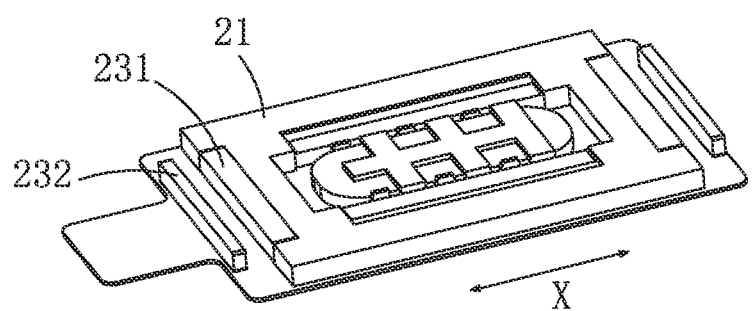
FIG. 9 is a perspective view of a linear vibration motor when a top cover is removed, according to another embodiment of the present disclosure.

As shown in FIG. 8 to FIG. 9, another embodiment of the present disclosure provides a linear vibration motor 200. The only difference between the linear vibration motor 200 and the linear vibration motor 100 is that the guide member 23 of the linear vibration motor 200 includes a first permanent magnet 231 fixed to the mass block 21 and a second permanent magnet 232 fixed to the side wall 13. The first permanent magnet 231 and the second permanent magnet 232 are opposite to each other along the vibration direction X. The first permanent magnet 231 and the second permanent magnet 232 are magnetized along the vibration direction X, and a pole of the first permanent magnet 231 and a pole of the second permanent magnet 232 that have a same polarity are opposite to each other. When the mass block 21 moves close to the first permanent magnet 231, the mass block 21 and the second permanent magnets 232 interact with each other to generate a resistance.

Compared with the related art, the vibration assembly of the linear vibration motor provided by the present disclosure includes the mass block having the accommodation hole, the magnet assembly fixed to the mass block, and the guide member for driving the mass block to reciprocate; the stator assembly at least partially accommodated in the accommodation hole includes the iron core and the coil wound on the iron core; the iron core includes the iron core body winding the coil, and the extending structure; and the extending structure includes the first extending portions, the first claw poles, the second extending portions, and the second claw poles; the first extending portions are parallel to and spaced apart from each other and each extend from the first end portion towards the magnet assembly; the first claw poles each bend and extend from an end of one of the first extending portions away from the iron core body towards the second end portion; the second extending portions are parallel to and spaced apart from each other and each extend from the second end portion towards the magnet assembly. After the coil is energized, the first claw pole and the second claw pole are polarized to interact with the magnet assembly to generate a driving force. With the first claw poles and the second claw poles that are staggered along the vibration direction, the thickness of the linear vibration motor is reduced while ensuring sufficient driving force, so that the linear vibration motor can be better applied to light and thin mobile terminals.

The above are merely some embodiments of the present disclosure. It should be noted that for those of ordinary skill in the art, improvements can be made without departing from the inventive concept of the present disclosure, but these all fall into the protection scope of the present invention.

What is claimed is:

1. A linear vibration motor, comprising:
a housing having an accommodation space; and
a vibration assembly and a stator assembly that are accommodated in the accommodation space,
wherein the vibration assembly comprises a mass block accommodated in the accommodation space, a magnet assembly fixed to the mass block, and a guide member configured to drive the mass block to reciprocate, wherein the mass block comprises an accommodation hole penetrating through the mass block, and the magnet assembly is accommodated in the accommodation hole;
wherein the stator assembly is fixed to the housing and is at least partially accommodated in the accommodation hole, and the stator assembly comprises an iron core fixed to the housing, and a coil wound on the iron core, wherein the iron core comprises an iron core body winding the coil, and an extending structure, wherein the iron core body comprises a first end portion and a second end portion that are arranged along a thickness direction of the coil, and
wherein the extending structure comprises first extending portions, first claw poles, second extending portions, and second claw poles, wherein the first extending portions are parallel to and spaced apart from each other and each extend from the first end portion towards the magnet assembly; the first claw poles each bend and extend from an end of one of the first extending portions away from the iron core body towards the second end portion; the second extending portions are parallel to and spaced apart from each other and each extend from the second end portion towards the magnet assembly; the second claw poles each bend and extend from an end of one of the second extending portions away from the iron core body towards the first end portion; and the first claw poles and the second claw poles are arranged at intervals along a vibration direction and directly face towards the magnet assembly.

2. The linear vibration motor as described in claim 1, wherein a projection of the first extending portion along the thickness direction is located between two adjacent second extending portions of the second extending portions.

3. The linear vibration motor as described in claim 1, wherein the iron core body has a height in the thickness direction, which is greater than a thickness of the coil, and the first end portion and the second end portion extend beyond the coil along the thickness direction.

4. The linear vibration motor as described in claim 2, wherein the coil comprises a first top surface perpendicular to the thickness direction, a first bottom surface opposite to the first top surface and spaced apart from the first top surface, and an outer side surface connecting the first top surface with the first bottom surface, wherein the first extending portions are parallel to the first top surface, the second extending portions are parallel to the first bottom surface, and the first claw poles and the second claw poles each are parallel to the outer side surface.

5. The linear vibration motor as described in claim 3, wherein the coil is in a shape of a racetrack, the outer side surface comprises a first outer side surface extending along a long axis and parallel to the vibration direction, and the first claw poles and the second claw poles are staggered in sequence along the first outer side surface.

6. The linear vibration motor as described in claim 1, wherein the magnet assembly comprises a magnet that is fixed to the mass block and opposite to and spaced apart from the first claw poles and the second claw poles, wherein the magnet has first magnetization regions opposite to the first claw poles, and second magnetization regions opposite to the second claw poles, wherein the first magnetization regions have a magnetization direction opposite to a magnetization direction of the second magnetization regions.

7. The linear vibration motor as described in claim 6, wherein the magnetization direction of the magnet is perpendicular to the thickness direction and the vibration direction.

8. The linear vibration motor as described in claim 7, wherein the housing comprises a bottom cover for fixing the iron core body, a top cover opposite to and spaced apart from the bottom cover, and a side wall for connecting the bottom cover with the top cover, and wherein the coil is spaced apart from the bottom cover and the top cover.

9. The linear vibration motor as described in claim 8, wherein the guide member is a spring, wherein the spring has an end fixed to the mass block, and another end fixed to the side wall.

10. The linear vibration motor as described in claim 8, wherein the guide member comprises a first permanent magnet fixed to the mass block, and a second permanent magnet fixed to the side wall, wherein the first permanent magnet and the second permanent magnet are opposite to each other along the vibration direction and are magnetized along the vibration direction, and a pole of the first permanent magnet and a pole of the second permanent magnet that have a same polarity are opposite to each other.

* * * * *